US006711109B1

(12) United States Patent
Fukuda

(10) Patent No.: US 6,711,109 B1
(45) Date of Patent: Mar. 23, 2004

(54) METHOD AND APPARATUS FOR MEASURING THE ECCENTRICITY OF DISK

(75) Inventor: Shuichi Fukuda, Tokyo (JP)

(73) Assignee: Sony Precision Technology Inc., Tokyo (JP)

( * ) Notice: Subject to any disclaimer, the term of this patent is extended or adjusted under 35 U.S.C. 154(b) by 749 days.

(21) Appl. No.: 09/652,326

(22) Filed: Aug. 31, 2000

(30) Foreign Application Priority Data

Sep. 2, 1999 (JP) .......................................... P11-248914

(51) Int. Cl.⁷ ................................................. G11B 7/00
(52) U.S. Cl. ................................ 369/53.14; 369/44.29; 369/44.32
(58) Field of Search ........................... 369/44.32, 44.29, 369/44.28, 47.36, 47.38, 47.44, 53.14, 53.12, 53.19, 53.23, 53.28, 53.3, 53.4, 53.43

(56) References Cited

U.S. PATENT DOCUMENTS 5,905,705 A * 5/1999 Takeda et al. ................ 360/51
5,995,318 A * 11/1999 Hasegawa et al. ........ 360/78.14
6,304,528 B1 * 10/2001 Kanda et al. ............. 369/44.28
6,341,113 B1 * 1/2002 Kamiyama ............... 369/53.15
6,526,006 B1 * 2/2003 Yoshimi et al. .......... 369/44.28

* cited by examiner

Primary Examiner—Thang V. Tran
Assistant Examiner—Bach Vuong
(74) Attorney, Agent, or Firm—Jay H. Maioli

(57) ABSTRACT

A method and an apparatus for measuring eccentricity of the tracks of a disk. The apparatus includes a spindle for driving a turntable carrying a disk, an angle detecting device for detecting the angle of rotation of the spindle, a reproducing head for reproducing information from the disk, a pair of servos for controlling the tracking operation of the head, an eccentricity measuring device for measuring the extent of eccentricity from a signal reproduced by the head, an error detecting device for obtaining a tracking error signal by turning on the tracking servos, and an operation device for determining the direction of eccentricity from the angle of rotation and the tracking error signal, determining a vector quantity of the eccentricity of the tracks from the extent of eccentricity and the direction of eccentricity, and for performing a vector operation to determine the quantity of eccentricity of the tracks.

4 Claims, 6 Drawing Sheets

METHOD AND APPARATUS FOR MEASURING THE ECCENTRICITY OF DISK

BACKGROUND OF THE INVENTION

1. Field of the Invention

This invention relates to a method and an apparatus for measuring the eccentricity of the tracks of a disk such as a CD or an MD and rating the disk for the quality.

2. Related Background Art

Generally, disks such as CDs and MDs are measured for the eccentricity of the tracks and rated in terms of the detected eccentricity of the tracks.

There are two known techniques for measuring the eccentricity of the tracks of an optical disk such as a CD or an MD by means of a player type instrument.

With one of the known techniques, the light beam from an optical pickup is made to produce a stationary light spot and the optical disk is rigidly held to a turn table arranged on a spindle and turned by means of the turn table, while the tracking servo is held off.

With this arrangement, the light beam crosses tracks within a full turn of the optical disk, the number of which is proportional to the eccentricity of the tracks as shown in FIG. 1. Note that the tracks move back and forth by a distance twice as much as the eccentricity within a full turn of the disk as shown in FIG. 2. In FIGS. 1 and 2, reference numeral 1 denotes an optical disk and reference symbols 1a, 1b and 1c respectively denote the positioning hole of the disk operating as center of rotation, the center of the tracks and the eccentricity of the tracks.

Thus, the light beam crosses a number of tracks that corresponds to four times of the eccentricity within a full turn of the disk. If the track pitch is 1.60 μm and the eccentricity of the tracks is 16.0 μm, the light beam crosses a total of 16.0 μm×4÷1.60 μm=40 tracks while the disk makes a full turn.

When the tracking error signal is observed during this measuring operation, it will be seen that the wave of the signal moves up and down (a motion referred to as traverse) once each time the light beam crosses a track. With this technique, the optical disk 1 is made to turn a plurality of times and the number of traverses is counted. Then, the number of traverses per turn and hence the eccentricity of the optical disk can be determined.

However, this measuring technique has a drawback that, if the spindle itself that drives the optical disk to turn involves eccentricity, the measured eccentricity includes that of the spindle and hence there is no way of knowing the true quantity of eccentricity of the optical disk 1.

With the other known measuring technique, the optical disk is played ordinarily while the tracking servo is held on. Then, if the tracks are arranged eccentrically, they will always be swerved radially so that the light beam is servo-controlled to follow the swerving motion of the tracks. Then, it will be found by observing the tracking error signal or the drive signal of the tracking servo that it meanders as shown in FIG. 3 as the spindle turns to drive the optical disk.

The meandering of the tracking error signal represents the swerving motion of the tracks that is twice as much as the eccentricity of the tracks even in a single turn of the optical disk so that the eccentricity is expressed by a quantity corresponding to ½ of the amplitude of the signal.

However, this second measuring technique also has the drawback that, if the spindle itself that causes the optical disk to turn involves eccentricity, the measured eccentricity includes that of the spindle and hence there is no way of knowing the true quantity of eccentricity of the optical disk 1. Furthermore this second measuring technique has an additional drawback that the relationship between the extent of the meandering of the electric signal as shown in FIG. 3 and the extent of the movement of the light beam has to be defined.

It is the object of the present invention to provide a method and an apparatus that can measure the true quantity of eccentricity of the tracks of a disk with a relatively simple arrangement.

SUMMARY OF THE INVENTION

According to the invention, the above object is achieved by providing a method of measuring the eccentricity of the tracks of a disk comprising steps of:

rigidly securing the disk to be evaluated to a turn table arranged on a spindle and driving the disk to reproduce the information recorded thereon by means of a reproducing head;

determining the extent of eccentricity from the signal reproduced by said reproducing head and the direction of eccentricity from the tracking error signal and the angle of rotation of said spindle obtained by turning on the tracking servo; and subsequently determining the quantity of eccentricity of the tracks of the disk to be evaluated in terms of vector quantity on the basis of said extent of eccentricity and said direction of eccentricity and then subtracting the vector quantity of the eccentricity of said spindle from the vector quantity of the eccentricity of the tracks of the disk.

Thus, according to the invention, the eccentricity of the tracks of the disk to be evaluated that is rigidly secured to a turn table arranged on a spindle is determined in therms of vector quantity and the vector quantity of the eccentricity of the spindle is subtracted from the vector quantity of the eccentricity of the tracks of the disk so that it is possible to determine the true quantity of eccentricity of the tracks of the disk to be evaluated that is free from the eccentricity of the spindle.

In another aspect of the invention, there is also provided a method of measuring the eccentricity of the tracks of a disk comprising steps of:

rigidly securing the disk to be evaluated to a turn table arranged on a spindle and driving the disk to reproduce the information recorded thereon by means of a reproducing head;

determining the first extent of eccentricity from the signal reproduced by said reproducing head and the first direction of eccentricity from the tracking error signal and the angle of rotation of said spindle obtained by turning on the tracking servo and subsequently determining the eccentricity of the tracks of the disk in terms of vector quantity from said first extent of eccentricity and said first direction of eccentricity;

rigidly securing said disk to said turn table so as to shift the phasic relationship of said disk and said spindle by 180°;

determining the second extent of eccentricity from the signal reproduced by said reproducing head and the second direction of eccentricity from the tracking error signal and the angle of rotation of said spindle obtained by turning on the tracking servo and subsequently determining the eccentricity of the tracks of the disk in terms of vector quantity from said second extent of eccentricity and said second direction of eccentricity;

subsequently determining the true quantity of eccentricity of the tracks of the disk to be evaluated by subtracting the second vector quantity from the first vector quantity.

With the above arrangement, since the second vector quantity of the eccentricity of the tracks of the disk to be evaluated is determined by shifting the phasic relationship between the disk and the spindle by 180°, if the first vector quantity E1 is expressed by formula below:

vector $E1$=vector $ME$+vector $E$, where ME is the vector quantity of the eccentricity of the spindle and E is the true vector quantity of eccentricity of the tracks of the disk to be evaluated, then the second vector quantity E2 is expressed by formula below:

vector $E2$=vector $ME$−vector $E$.

Thus, the true quantity of eccentricity E of the tracks of the disk to be evaluated is obtained by subtracting the second vector quantity E2 from the first vector quantity E1 or vector $E1$−vector $E2$=2×vector $E$.

In still another aspect of the invention, there is also provided an apparatus of measuring the eccentricity of the tracks of a disk comprising:

a spindle for driving a turn table adapted to carry a disk to be evaluated;

angle of rotation detecting means for detecting the angle of rotation of the spindle;

a reproducing head for reproducing the information stored on the disk;

tracking servos for control the tracking operation of the reproducing head;

extent of eccentricity measuring means for measuring the extent of eccentricity from the signal reproduced by the reproducing head;

tracking error detecting means for obtaining a tracking error signal by turning on the tracking servo; and an operation means for determining the direction of eccentricity from the angle of rotation of the spindle and the tracking error signal, determining the vector quantity of the eccentricity of the tracks of the disk from the extent of eccentricity and the direction of eccentricity and carrying out a vector operation to determine the true quantity of eccentricity of the tracks of the disk.

Thus, according to the invention, it is now possible to determine the true quantity of eccentricity of the tracks of a disk to be evaluated that does not include the eccentricity of the spindle by means of a relatively simple arrangement.

DETAILED DESCRIPTION OF THE PREFERRED EMBODIMENT

Now, a method and an apparatus of measuring the eccentricity of the tracks of a disk according to the invention will be described in greater detail by referring to the accompanying drawings that illustrate a preferred embodiment of the invention.

Figure 1:
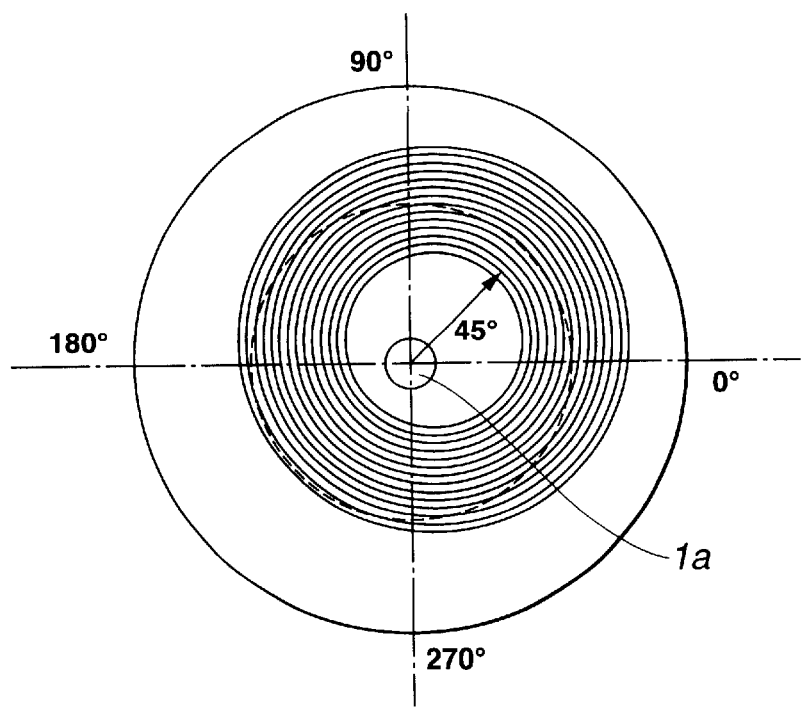
FIG. 1 is a schematic illustration of the tracks of a disk the can be used for the purpose of the invention.
Figure 2:
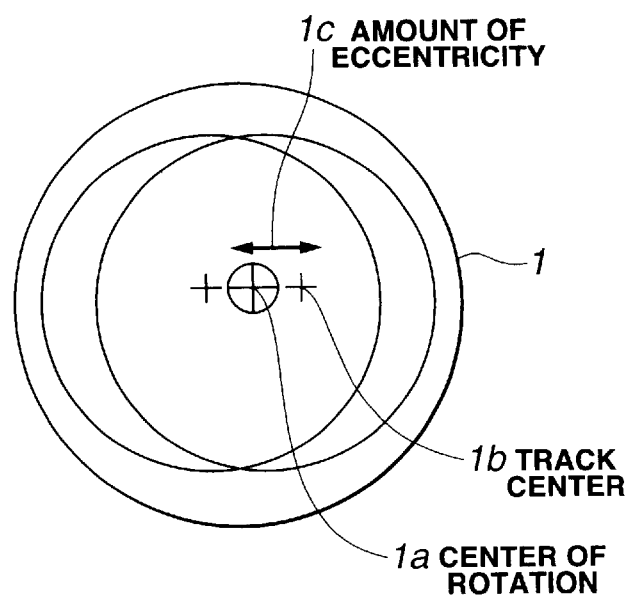
FIG. 2 is a schematic illustration of the eccentricity of the tracks of a disk that can be used for the purpose of the invention.
Figure 4:
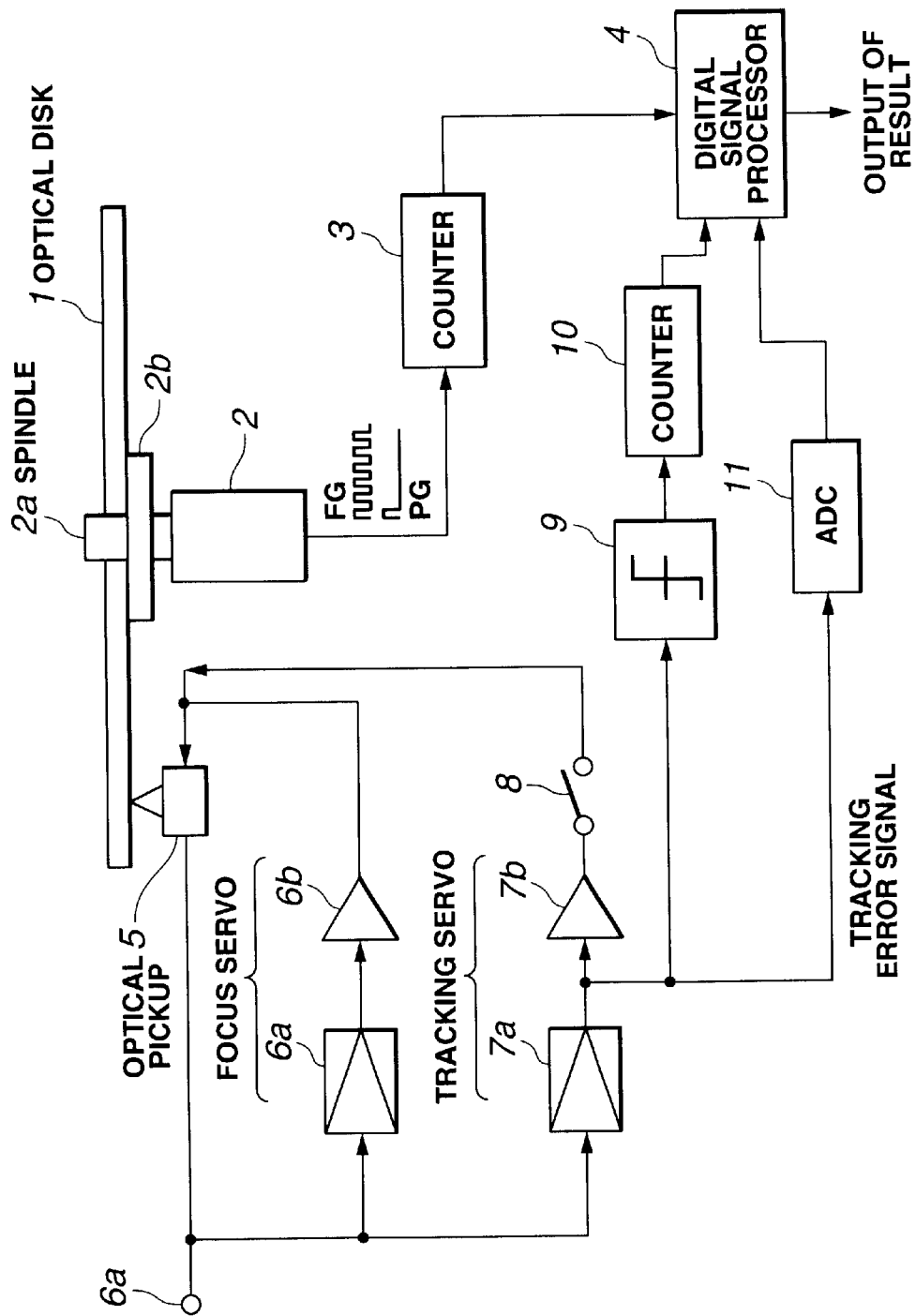
FIG. 4 is a schematic block diagram of an embodiment of apparatus of measuring the eccentricity of the tracks of a disk according to the invention.

FIG. 4 is a schematic block diagram of an embodiment of apparatus of measuring the eccentricity of the tracks of a disk according to the invention. Referring to FIG. 4, reference numeral 1 denotes an optical disk such as a CD (compact disk) to be measured for the eccentricity of the tracks thereof. As described above by referring to FIG. 1, the optical disk 1 has a number tracks that are concentrically arranged and carry a string of signals recorded thereon and also a positioning hole 1a arranged substantially at the center of the disk to operate as center of rotation.

In FIG. 4, reference numeral 2 denotes a spindle motor that drives the optical disk 1 to turn at a constant linear speed. The spindle motor 2 may be so arranged that a single PG pulse and a total of 512 FG pulses are obtained while the optical disk 1 makes a full turn as the FG pulses are based on the PG signal. Then, the PG pulse and the FG pulses are fed to counter 3. Reference symbol 2b in FIG. 4 denotes a turn table rigidly secured to the spindle 2a (rotary shaft) of the spindle motor 2.

The counter 3 counts the number of FG pulses on the basis of the PG pulse to determine the angle of rotation of the optical disk 1 or the spindle 2 and sends an angle of rotation signal representing the angle of rotation of the spindle as determined by the counter 3 to digital signal processor (DSP) 4, which is an operating circuit comprising a microcomputer.

In FIG. 4, reference member 5 denotes an optical pickup, or a reproducing head, for reproducing signals stored on the optical disk 1. The optical pickup 5 typically comprises a laser diode and is adapted to emit light from the laser diode to a beam splitter by way of a grating so as to irradiate the optical disk 1 with the light beam reflected by the beam splitter by way of an objective lens. Then, the light beam (detection light beam) reflected by the optical disk 1 is fed to the photodiode of a detector by way of said objective lens and said beam splitter.

Then, the readout signal obtained by the optical pickup 5 is fed to readout signal output terminal 5a while the focus error signal obtained also by the optical pickup 5 is fed to focus drive circuit 6b by way of the amplifier circuit 6a of a focus servo so that the focus of the light beam of the optical pickup 5 is controlled by the output signal of the focus drive circuit 6b.

The tracking error signal also obtained by the optical pickup 5 is fed to tracking drive circuit 7b by way of the amplifier circuit 7a of a tracking servo and the output signal of the tracking drive circuit 7b is fed to the optical pickup 5 by way of contact switch 8 for turning on/off the tracking servo so that the tracking of the light beam of the optical pickup 5 is controlled by the output signal of the tracking drive circuit 7b.

The tracking error signal obtained at the output side of the amplifier circuit 7a is fed to traverse counter 10 by way of a binarization circuit 9, which traverse counter 10 counts the number of traverses contained in the tracking error signal and hence the number of tracks crossed by the light beam. The number of traverses obtained at the output side of the traverse counter 10 is then fed to digital signal processor 4 by way of A/D converter circuit 11 for converting an analog signal into a digital signal. Otherwise, the configuration of FIG. 4 is similar to that of a known ordinary optical player.

Figure 6:
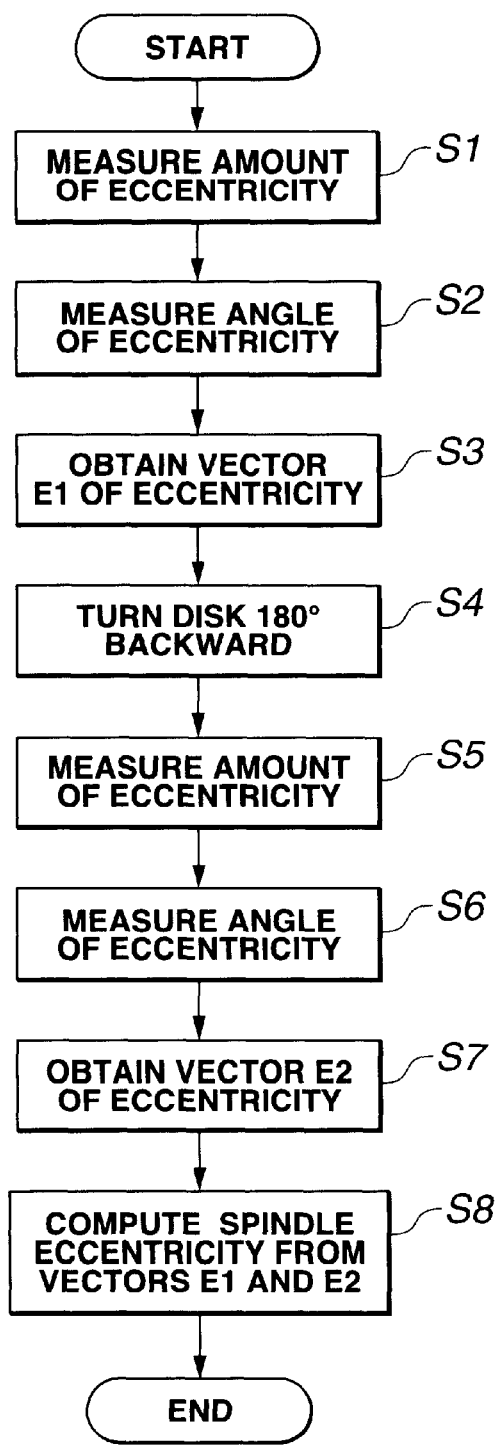
FIG. 6 is a flow chart of the operation of the digital signal processor of the embodiment of FIG. 4.

FIG. 6 shows a flowchart of the operation of measuring the eccentricity of the tracks of the optical disk 1 by means of this embodiment having the above described configuration. To begin with, the optical disk 1 to be evaluated is rigidly secured to the turn table 2b and the light beam emitted from the optical pickup 5 is made stationary while both the contact switch 8 and the tracking servo are held off. Then, the spindle motor 2 is activated to turn the optical disk 1 and the number of traverse contained in the tracking error signal obtained by the optical pickup 5 is counted by the traverse counter 10. The count value of the traverse counter 10 is then fed to the digital signal processor 4, which digital signal processor 4 then performs the above described operation to determine the eccentricity of the tracks of the optical disk 1.

At this time, the tracks of the optical disk 1 is swerved by an amount equal to twice the extent of eccentricity in a single turn before they return to the respective original positions. Thus, the light beam moves back and forth, crossing tracks, the number of which corresponds to twice the extent of eccentricity. Therefore, the quantity of eccentricity E1 can be determined by multiplying ¼ of the number of traverses (the number of tracks crossed by the light beam) as counted by the traverse counter by the pitch of the tracks (Step S1).

Figure 3:
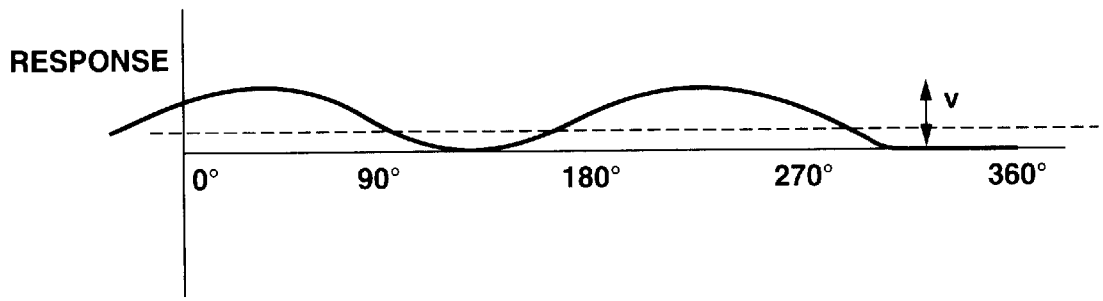
FIG. 3 is a graph schematically illustrating a tracking error signal that can be used for the purpose of the invention.

Then, the direction of eccentricity (the angle of eccentricity) relative to the original point of the spindle 2a is determined (Step S2). With this embodiment, the contact switch 8 is turned to turn on the tracking servo for ordinary readout operation and the tracking error signal obtained at the output side of the amplifier circuit 7a and having a waveform as shown in FIG. 3 is fed to the digital signal processor 4 by way of the A/D converter circuit 11, while the PG pulse and the FG pulses obtained by the spindle motor 2 is fed to the counter 3. Then, the output of the counter 3 is also fed to the digital signal processor 4 so that the latter can determine the angle of rotation of the spindle 2a.

The digital signal processor 4 then determines the swerve of the tracking error signal and also the direction of eccentricity θ1 relative to the original point of the spindle 2a on the basis of the angle of rotation of the spindle 2a (Step S2).

Thereafter, the digital signal processor 4 determines the vector of the eccentricity of the optical disk 1 on the basis of quantity of eccentricity E1 and the direction of eccentricity θ1, which is referred to as vector E1 (Step S3). As seen from FIG. 5, the vector E1 can be expressed by formula below.

vector $E1 = E1 \cos \theta1 + E1 \sin \theta1$

Note that the vector E1 includes the vector ME of the eccentricity of the spindle 2a. In other words, if the vector of the true quantity of eccentricity of the optical disk 1 is E, the vector E1 is expressed by formula below.

vector $E1$ = vector $ME$ + vector $E$

Figure 5:
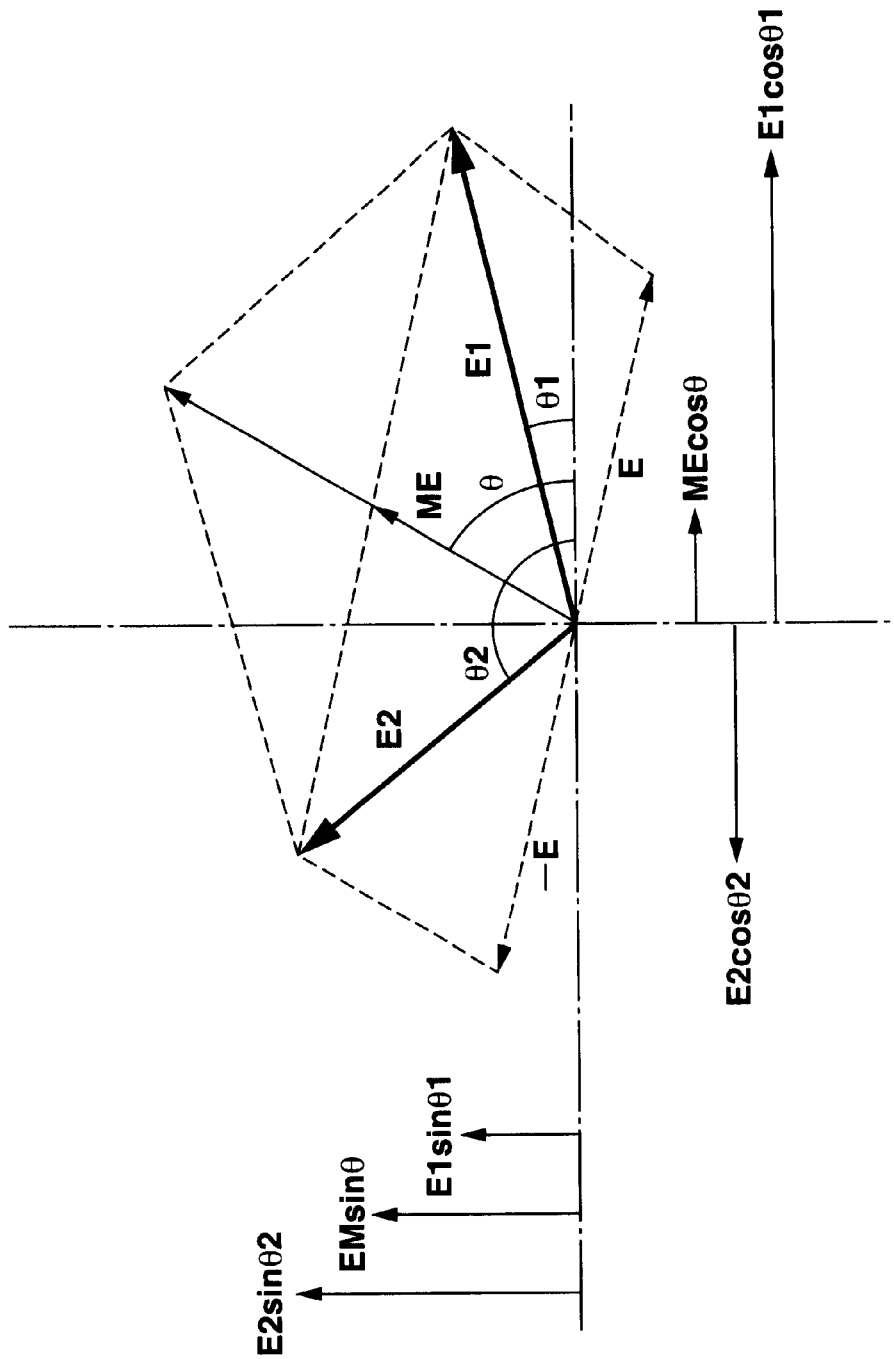
FIG. 5 is a graph schematically illustrating the swerving motion of the tracks of a disk.

In FIG. 5, θ represents the direction of eccentricity of the spindle 2a.

Figure 7A:
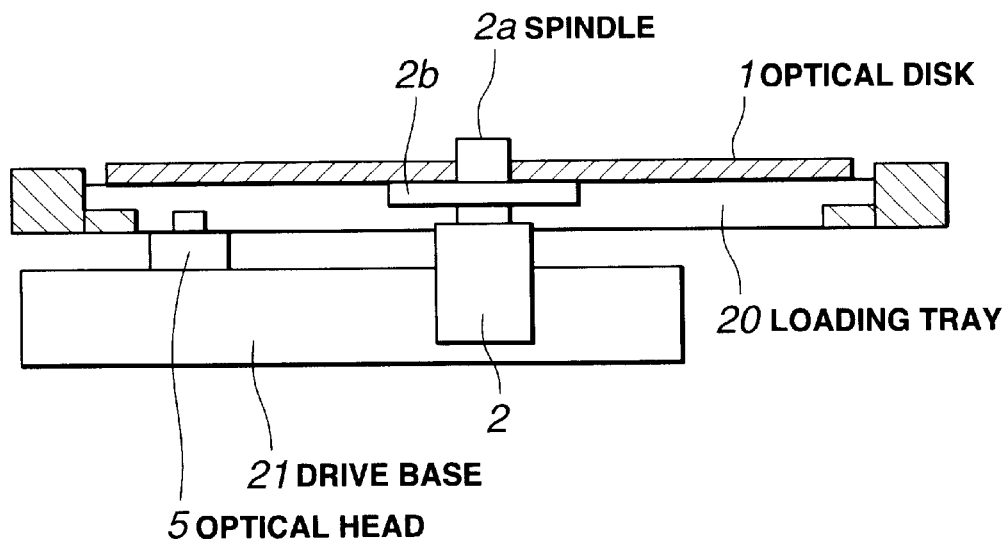
FIGS. 7A and 7B are a schematic illustrations of the loading mechanism of a turn table that can be used for the purpose of the invention.
Figure 7B:
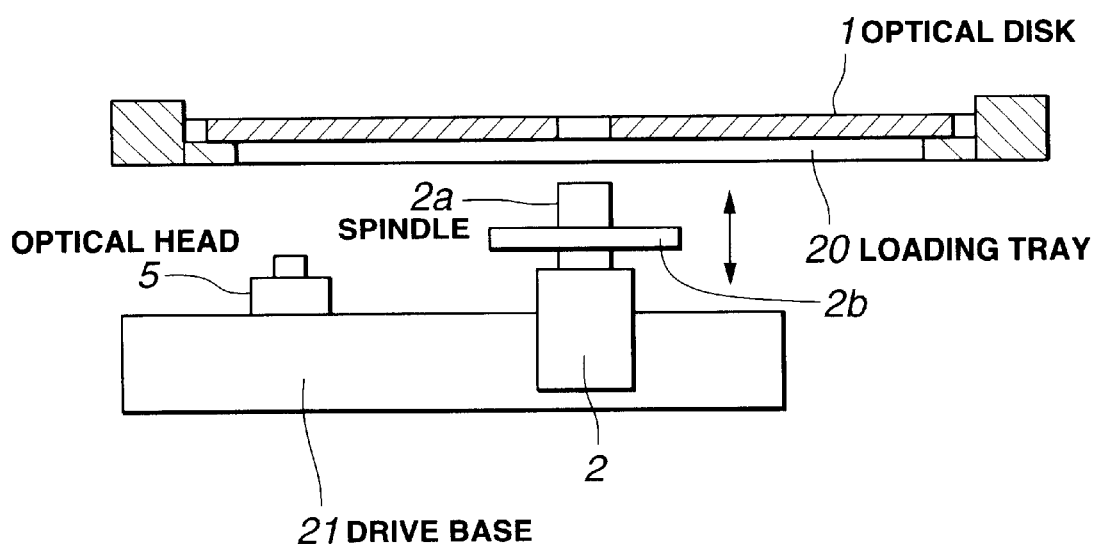

Subsequently, the optical disk 1 is released from the turn table and then rigidly secured to it once again in such a way that the phasic relationship between the optical disk 1 and the spindle 2a shows a difference of 180° from that of the above arrangement (Step S4). If the loading mechanism of an ordinary player comprising a loading tray 20 as shown in FIGS. 7A and 7B is used for loading the optical disk 1, drive base 21 is lowered by means of the loading mechanism and both the spindle 2a and the turn table 2b are turned by 180° by using the servo adapted to use the PG pulse and the FG pulses of the spindle motor 2, while the optical disk 1 is held on the loading tray 20. Thereafter, the drive base is raised back and the optical disk 1 is once again rigidly secured to the turn table 2b.

Then, as in Step S1, the contact switch 8 is turned off to turn the tracking servo off and the light beam emitted from the optical pickup is made stationary. Then, the spindle motor 2 is activated to turn the optical disk 1 and the number of traverse contained in the tracking error signal obtained by the optical pickup 5 is counted by the traverse counter 10. The count value of the traverse counter 10 is then fed to the digital signal processor 4, which digital signal processor 4 then performs the above described operation to determine the quantity of eccentricity E2 of the tracks of the optical disk 1 (Step S5).

Thereafter, the direction of eccentricity (the angle of eccentricity) relative to the original point of the spindle 2a is determined as in Step S2 (Step S6). With this embodiment, the contact switch 8 is turned to turn on the tracking servo for ordinary readout operation and the tracking error signal obtained at the output side of the amplifier circuit 7a and having a waveform as shown in FIG. 3 is fed to the digital signal processor 4 by way of the A/D converter circuit 11, while the PG pulse and the FG pulses obtained by the spindle motor 2 is fed to the counter 3. Then, the output of the counter 3 is also fed to the digital signal processor 4 so that the latter can determine the angle of rotation of the spindle 2a.

The digital signal processor 4 then determines the swerve of the tracking error signal and also the direction of eccentricity θ2 relative to the original point of the spindle 2a on the basis of the angle of rotation of the spindle 2a (Step S6).

Thereafter, the digital signal processor 4 determines the vector of the eccentricity of the optical disk 1 on the basis of quantity of eccentricity E2 and the direction of eccentricity θ2, which is referred to as vector E2 as obtained by modifying the phasic relationship between the optical disk 1 and the spindle 2a by 180° relative to the one used for determining the vector E1 (Step S7). As seen from FIG. 5, the vector E1 can be expressed by formula below.

vector $E2 = E2 \cos \theta2 + E2 \sin \theta2$

Note that the vector E2 includes the vector ME of the eccentricity of the spindle 2a. In other words, the vector E2 is expressed also by formula below.

vector $E2$ = vector $ME$ − vector $E$

Then, the digital signal processor 4 subtract the vector E2 from the vector E1. Thus, vector $E1$ − vector $E2 = 2 \times$ vector $E$ and hence the true quantity of eccentricity can be determined (Step S8).

As the vector E1 and the vector E2 are added in Step S8, or vector $E1$ + vector $E2 = 2 \times$ vector $ME$ so that it is now possible to determined the quantity of eccentricity of the spindle 2a.

Since the vector E2 is obtained by modifying the phasic relationship between the optical disk 1 and the spindle 2a by 180° relative to the one used for determining the vector E1, if the vector E1 is expressed by the formula of vector $E1$=vector $ME$+vector $E$, then the vector E2 is expressed by the formula of vector $E2$=vector $ME$−vector $E$ so that the true quantity of eccentricity E of the optical disk 1 can be obtained by subtracting the vector E2 from the vector E1 or vector $E1$−vector $E2$=2×vector $E$.

While the vector E2 is subtracted from the vector E1 to determine the true quantity of eccentricity E of the optical disk 1 in the above embodiment, the quantity of eccentricity E of the optical disk 1 can alternatively be obtained by adding the vector E1 and the vector E2 to determine the vector of eccentricity ME of the spindle 2a and then subtracting the vector of eccentricity ME of the spindle 2a from the vector E1.

If the vector of eccentricity ME of the spindle 2a is known by any other means, the true quantity of eccentricity E of the optical disk 1 can be determined simply by obtaining the vector E1 and subtracting the vector of eccentricity ME of the spindle 2a from the vector E1.

While the quantities of eccentricity E1 and E2 are measured by means of the traverses of the tracking error signal in the above description, it may be appreciated that the quantities of eccentricity E1 and E2 can alternatively be obtained from the meandering of the tracking error signal as shown in FIG. 3.

The present invention is by no means limited to the above described embodiment, which may be altered or modified appropriately without departing from the scope of the invention.

What is claimed is:

1. A method of measuring an eccentricity of tracks of a disk, comprising the steps of:

securing the disk rigidly to a turntable arranged on a spindle and driving the disk to reproduce information recorded on the disk using a reproducing head;

determining an extent of eccentricity from a signal reproduced by the reproducing head and direction of eccentricity from a tracking error signal and an angle of rotation of the spindle obtained by turning on a tracking servo; and determining a quantity of eccentricity of the tracks of the disk in terms of a first vector quantity based on the extent of eccentricity and the direction of eccentricity, and subtracting a second vector quantity representing an eccentricity of the spindle from the first vector quantity representing the eccentricity of the track, of the disk.

2. A method of measuring an eccentricity of tracks of a disk, comprising the steps of:

securing the disk rigidly to a turntale arranged on a spindle and driving the disk to reproduce information recorded on the disk using a reproducing head;

determining a first degree of eccentricity from a signal reproduced by the reproducing head and a first direction of eccentricity from a tracking error signal and an angle of rotation of the spindle obtained by turning on a tracking servo, and determining the eccentricity of the tracks of the disk in terms of a first vector quantity from the first extent of eccentricity and the first direction of eccentricity;

securing the disk rigidly to the turntable such that a phase relationship of the disk and the spindle is shifted by 180°;

determining a second extent of eccentricity from the signal reproduced by the reproducing head and a second direction of eccentricity from the tracking error signal and the angle of rotation of the spindle obtained by turning on the tracking servo, and determining the eccentricity of the tracks of the disk in terms of a second, vector quantity from the second extent of eccentricity and the second direction of eccentricity; and determining a true quantity of eccentricity of the tracks of the disk by subtracting the second vector quantity from the first vector quantity.

3. The method of measuring the eccentricity of the tracks of the disk according to claim 1 or claim 2, wherein the first vector quantity and the second vector quantity are added to determine a third vector quantity representing an eccentricity of the spindle, and the third vector quantity representing the eccentricity of the spindle is subtracted from the first vector quantity.

4. An apparatus for measuring an eccentricity of a disk, comprising:

a spindle for driving a turntable that carries a disk;

angle of rotation detecting means for detecting an angle of rotation of the spindle;

a reproducing head for reproducing information stored on the disk;

a plurality of tracking servos for controlling a tracking operation of the reproducing head;

extent of eccentricity measuring means for measuring an extent of eccentricity from a signal reproduced by the reproducing head;

tracking error detecting means for obtaining a tracking error signal by turning on the plurality of tracking servos; and operation means for determining a direction of eccentricity from the angle of rotation of the spindle and the tracking error signal; determining a vector quantity representing an eccentricity of the tracks of the disk from the extent of eccentricity and the direction of eccentricity; and performing a vector operation to determine a true quantity of eccentricity of the tracks of the disk.

\* \* \* \* \*